Nov. 27, 1923.

O. MEYER-KELLER 1,475,645

ELECTRIC WATER HEATER

Filed Feb. 21, 1922

Otto Meyer-Keller.
Inventor.

By William C. Linton,
Attorney.

Patented Nov. 27, 1923.

1,475,645

UNITED STATES PATENT OFFICE.

OTTO MEYER-KELLER, OF LUCERNE, SWITZERLAND.

ELECTRIC WATER HEATER.

Application filed February 21, 1922. Serial No. 538,307.

*To all whom it may concern:*

Be it known that I, OTTO MEYER-KELLER, engineer, a citizen of Switzerland, residing at No. 45 Geissensteinstrasse, Lucerne, Switzerland, have invented certain new and useful Improved Electric Water Heaters; and I do hereby declare that the following is a full, clear, and exact description of the invention, such as will enable others skilled in the art to which it appertains to make and use the same.

This invention relates to electric water heaters of the kind in which a central electrode is combined with an outer electrode in the form of a shielding casing that consists of at least two parts which may be adjusted relatively to said central electrode. My present invention consists in letting said central electrode have the shape of a wedge and in arranging the casing portions obliquely corresponding to the oblique sides or surfaces of that wedge.

The invention in general is an improvement upon the electric water heater shown and described in my United States application Serial Number 491,778, filed August 12, 1921, and in particular it is an improvement upon the form of construction shown in Figure 5 of that application where the casing has somewhat oblique walls, whereas the central electrode is cylindrical. The object of the improvement is to provide for a stronger development of steam in the widened upper portion of the water heater than in its narrow lower one; other objects are to simplify the construction and making it more easily regulable as regards its performance, the regulation being effected either by adjusting the insulating casing relatively to the electrode, and reversely, or by varying the height of the level of the liquid.

Figure 1:
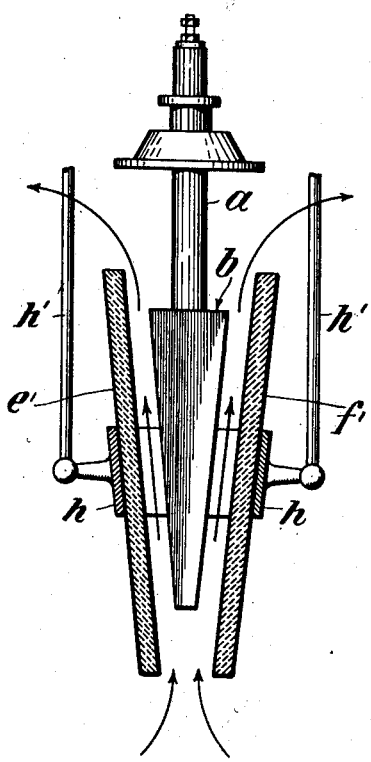
Figure 2:
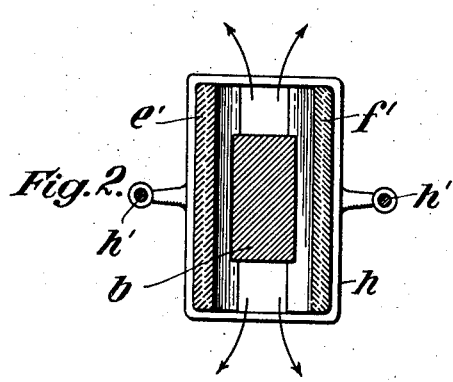

In order to make my invention more clear, I refer to the accompanying drawing, in which Figure 1 is a longitudinal section through the improved water heater, and Figure 2 is a transverse section through it.

Now, referring to said figures, the electrode $b$ which is attached to the insulated member $a$ is wedge-shaped, the configuration being such that its main lateral surfaces converge towards the bottom of the vessel containing the water heater. The casing which surrounds and encloses the electrode $b$ is, as in the application 491,778 in general and in Figure 5 of that application in particular, subdivided in its longitudinal direction, in such a manner, that two individual shielding electrodes or bodies $e'$ and $f'$ are formed, the oblique position of which corresponds to the obliquity of the opposite surfaces of the electrode $b$.

The bodies or plates $e'$ $f'$ are attached to a frame $h$ suspended from rods $h'$ by which they may be simultaneously lifted or lowered, as the case may be, whereby the performance of the heater is varied. The same result, however, may be had by varying the level of the liquid contained in the vessel, in such a manner, that the active conducting portion of the electrode is increased or decreased, as the case may be. It will be obvious that the current will flow between the central and casing electrodes in the usual manner.

Having now described my invention, what I desire to secure by a patent of the United States is:

1. In an electric water heater, a central wedge shaped electrode substantially rectangular in cross section, a pair of rectangular shielding electrodes arranged upon the opposite sides of said electrode and parallel thereto, and means connected to said shielding electrodes for collectively adjusting the same with respect to the opposite sides of said central electrode.

2. In an electric water heater, a central wedge shaped electrode substantially rectangular in cross section, a pair of opposed shielding electrodes arranged in proximity to the opposite sides of said central electrode and in parallelism to the opposite sides of the same, said shielding electrodes projecting above, below and beyond the opposite sides of the central electrode and means connected to said shielding electrodes for effecting collective vertical adjustment thereof with respect to said central electrode.

In witness whereof I have hereunto set my hand.

OTTO MEYER-KELLER, ING.

In the presence of:
ALF. DREYER,
E. C. WACHS,
MARGERY ZUND.